(12) United States Patent
Kawashima

(10) Patent No.: US 9,741,981 B2
(45) Date of Patent: Aug. 22, 2017

(54) ELECTRONIC APPARATUS HAVING LOCK MECHANISM FOR LOCKING BATTERY ACCOMMODATED IN BATTERY COMPARTMENT

(71) Applicant: CANON KABUSHIKI KAISHA, Tokyo (JP)

(72) Inventor: Hideki Kawashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 14/632,564

(22) Filed: Feb. 26, 2015

(65) Prior Publication Data
US 2015/0249235 A1    Sep. 3, 2015

(30) Foreign Application Priority Data

Mar. 3, 2014    (JP) ................................ 2014-040235
Jul. 7, 2014    (JP) ................................ 2014-139755

(51) Int. Cl.
*H01M 2/10*    (2006.01)
*H04N 5/225*    (2006.01)

(52) U.S. Cl.
CPC ........ *H01M 2/1022* (2013.01); *H04N 5/2252* (2013.01); *H01M 2220/30* (2013.01)

(58) Field of Classification Search
CPC ............ H01M 2/1022; H01M 2220/30; H04N 5/2252
See application file for complete search history.

(56) References Cited

U.S. PATENT DOCUMENTS

| 2007/0205208 A1* | 9/2007 | Ueda ...................... G03B 17/02 220/813 |
| 2010/0062324 A1* | 3/2010 | Ooyama ............. H01M 2/0404 429/97 |
| 2010/0143779 A1* | 6/2010 | Jiang ................... H01M 2/1061 429/100 |

FOREIGN PATENT DOCUMENTS

| CN | 1531337 A | 9/2004 |
| CN | 1770556 A | 5/2006 |
| CN | 103201874 | 7/2013 |

(Continued)

OTHER PUBLICATIONS

The above foreign patent documents were cited in a Nov. 28, 2016 Chinese Office Action, which is enclosed with an English Translation, that issued in Chinese Patent Application No. 201510092334.0.

*Primary Examiner* — Muhammad Siddiquee
(74) *Attorney, Agent, or Firm* — Cowan, Liebowitz & Latman, P.C.

(57) ABSTRACT

An electronic apparatus with a lock mechanism for locking a battery in a battery compartment, with high space efficiency, even when the sizes of an apparatus body and the battery are reduced. A digital camera includes a battery compartment member formed with a battery compartment for removably accommodating a battery, a battery lid for opening and closing an insertion opening of the battery compartment, a pivot shaft for pivotally supporting the battery lid, a lock member for engaging the battery to lock the same, and an urging member for urging the battery lid in an opening direction. The lock member can move along an axis of the pivot shaft between a position for engaging the battery and a position for releasing the engagement. The urging member is disposed coaxially with the pivot shaft and (Continued)

urges the lock member toward the position for engaging the battery.

3 Claims, 12 Drawing Sheets

(56) References Cited

FOREIGN PATENT DOCUMENTS

| JP | 4019776 B2 | 12/2007 |
|---|---|---|
| JP | 2010-186633 A | 8/2010 |
| JP | 2013-130700 A | 7/2013 |

* cited by examiner

ELECTRONIC APPARATUS HAVING LOCK MECHANISM FOR LOCKING BATTERY ACCOMMODATED IN BATTERY COMPARTMENT

BACKGROUND OF THE INVENTION

Field of the Invention

The invention relates to an electronic apparatus, such as a digital camera or a digital video camera, which has a lock mechanism for locking a battery accommodated in a battery compartment.

Description of the Related Art

An electronic apparatus, such as a digital camera, has an apparatus body thereof formed therein with a battery compartment for removably accommodating a battery. The battery compartment has a battery lid attached thereto for covering a battery insertion opening such that the battery insertion opening can be opened and closed, and a lock mechanism provided for locking the battery accommodated therein.

As a lock mechanism, there has been disclosed one configured to lock a battery accommodated in a battery compartment, using a lock member which is pivotally moved by way of a pivot shaft extending orthogonal to a direction of insertion of the battery into the battery compartment (see Japanese Patent Laid-Open Publication No. 2010-186633). Further, there has been disclosed another lock mechanism configured to lock a battery accommodated in a battery compartment, using a lock member capable of sliding along a battery insertion opening-side end face of the battery (see Publication of Japanese Patent No. 4019776). Furthermore, there has been disclosed a technique in which a coupler with a cable for external power supply is removably accommodated in a battery compartment (see Japanese Patent Laid-Open Publication No. 2013-130700).

As for Japanese Patent Laid-Open Publication No. 2010-186633, however, e.g. in a case where the size of the apparatus body and that of the battery are reduced along with the further reduction of the size of the apparatus, the necessity of securing space for disposing a hinge of the battery lid, an urging member for urging the battery lid in an opening direction, and so forth, makes it difficult to lay out the lock mechanism.

On the other hand, as for Publication of Japanese Patent No. 4019776, it is necessary to secure space for slidingly moving the lock member, which causes an increase in size of the electronic apparatus. Further, as for Japanese Patent Laid-Open Publication No. 2013-130700, in the case of receiving the coupler with the cable in the battery compartment, it is required to dispose the lock member such that a cable draw-out opening is not blocked by the lock member, which makes it further difficult to lay out the lock mechanism.

SUMMARY OF THE INVENTION

The invention provides an arrangement which makes it possible to dispose a lock mechanism for locking a battery accommodated in a battery compartment of an electronic apparatus, with high space efficiency, even when the size of an apparatus body and that of the battery are reduced, to thereby achieve reduction of the number of component parts and the thickness and size of the electronic apparatus.

The invention provides an electronic apparatus comprising a battery compartment member configured to have a battery compartment formed therein for removably accommodating a battery or a coupler, a battery lid configured to be capable of opening and closing an insertion opening of the battery compartment, a pivot shaft configured to pivotally support the battery lid, a lock member configured to be brought into engagement with the battery or the coupler accommodated in the battery compartment to thereby lock the battery or the coupler, and an urging member configured to urge the battery lid in an opening direction, wherein the lock member is provided such that the lock member is capable of moving along an axis of the pivot shaft between a first position for being brought into engagement with the battery or the coupler and a second position for releasing the engagement, and wherein the urging member is disposed coaxially with the pivot shaft and urges the lock member toward the first position.

According to the invention, even when the size of the apparatus body of the electronic apparatus and that of the battery are reduced, it is possible to dispose a lock mechanism for locking the battery accommodated in the battery compartment, with high space efficiency, to thereby achieve reduction of the number of component parts and the thickness and size of the electronic apparatus.

Further features of the invention will become apparent from the following description of exemplary embodiments (with reference to the attached drawings).

DESCRIPTION OF THE EMBODIMENTS

The invention will now be described in detail below with reference to the accompanying drawings showing embodiments thereof.

Figure 1A:
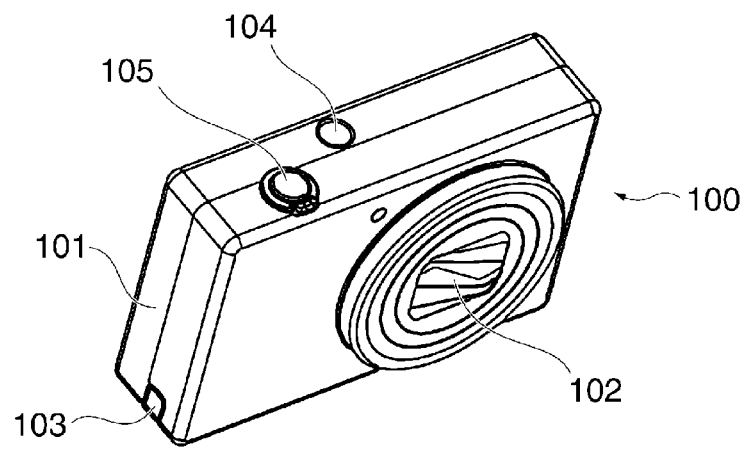
FIG. 1A is a front perspective view of a digital camera, as viewed from above and the front, which is an electronic apparatus according to a first embodiment of the invention.
Figure 1B:
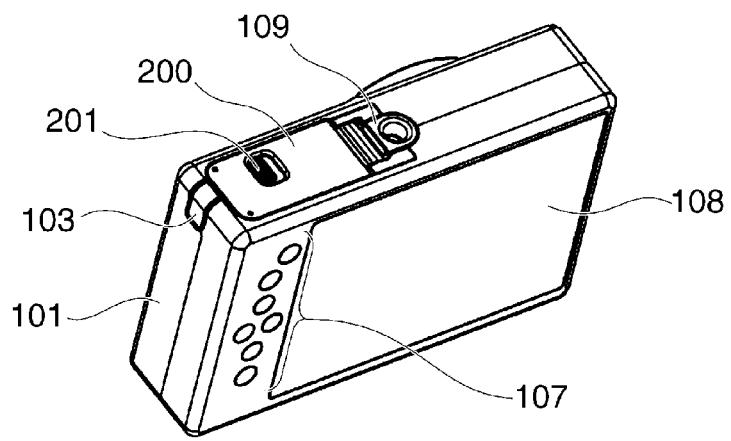
FIG. 1B is a rear perspective view of the digital camera shown in FIG. 1A, as viewed from the bottom side thereof.

FIG. 1A is a front perspective view of a digital camera, as viewed from above and the front, which is an electronic apparatus according to a first embodiment of the invention, and FIG. 1B is a rear perspective view of the digital camera shown in FIG. 1A, as viewed from the bottom side thereof.

As shown in FIG. 1A, the digital camera 100 of the present embodiment has a zooming lens barrel unit 102 provided on the front side of a camera body 101, and a power button 104 and a release button 105 provided on a top surface of the camera body 101.

As shown in FIG. 1B, the camera body 101 has a rear surface thereof provided with a display section 108, and an operation button group 107 comprised of various operation buttons is disposed beside the display section 108. In a central portion of the bottom of the camera body 101, there is provided a tripod socket 109, and a battery lid 200 is provided beside the tripod socket 109 for covering an insertion opening of a battery compartment 110a (see FIG. 1C) such that the battery lid 200 can open and close the insertion opening.

The battery compartment 110a is formed in a battery compartment member 110 (see FIG. 2), and the battery lid 200 is supported by a pivot shaft 205 (see FIG. 2) disposed toward the tripod socket 109 of the battery compartment member 110, such that the battery lid 200 can be pivotally moved in opening and closing directions with respect to the camera body 101. The battery lid 200 is provided with a operation member 201 which is slidable. The battery lid 200 can be opened and closed by slidingly operating the operation member 201.

Figure 1C:
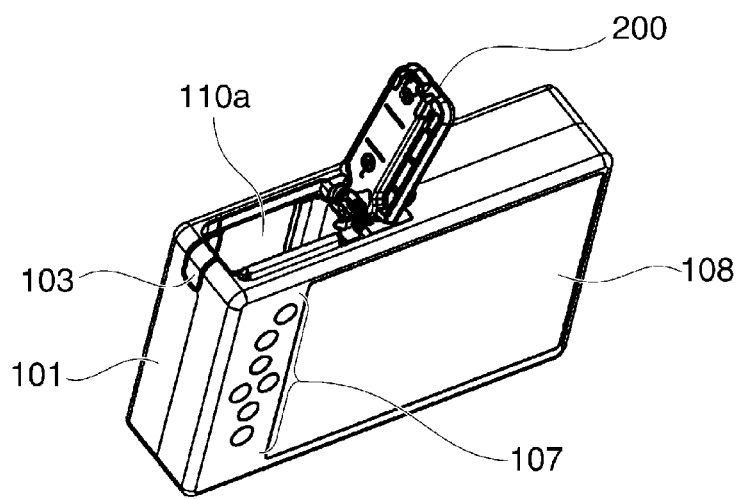
FIG. 1C is a perspective view of the digital camera shown in FIG. 1B in a state where a battery lid is open.

FIG. 1C is a perspective view of the digital camera 100 shown in FIG. 1B in a state where the battery lid 200 is open. As shown in FIG. 1C, by opening the battery lid 200, the battery compartment 110a in which a battery 400 (see FIG. 3) or a coupler 300 (see FIG. 8), referred to hereinafter, is removably accommodated is exposed to the outside of the digital camera 100.

Note that in the present embodiment, when the battery lid 200 is open, not only the battery 400 or the coupler 300, but also an external recording medium 401 (see FIG. 6) can be removably inserted in the battery compartment 110a. Further, between a side surface of the camera body 101 and the battery compartment 110a, there is formed a cable lid 103 that can be opened and closed. The cable lid 103 will be described hereinafter.

Figure 2:
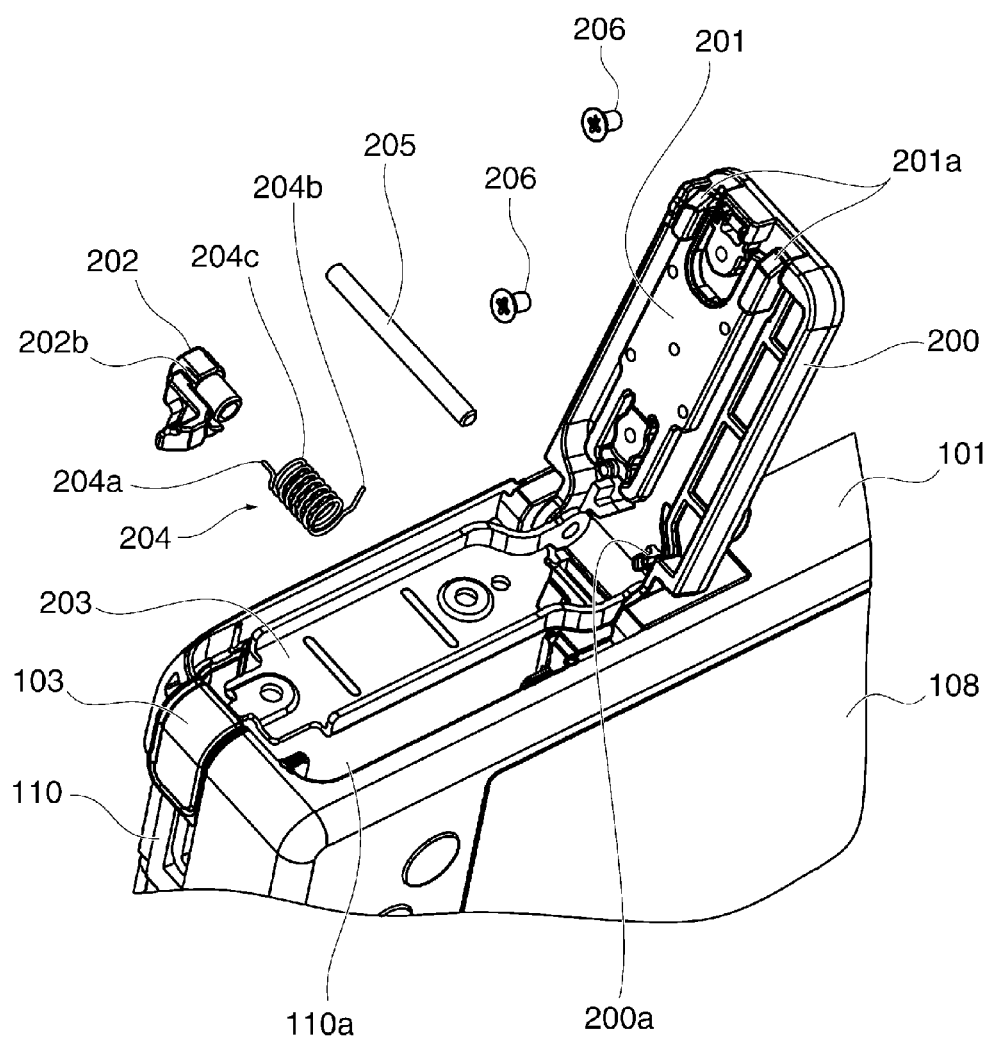
FIG. 2 is an exploded perspective view of a battery lid unit.
Figure 3:
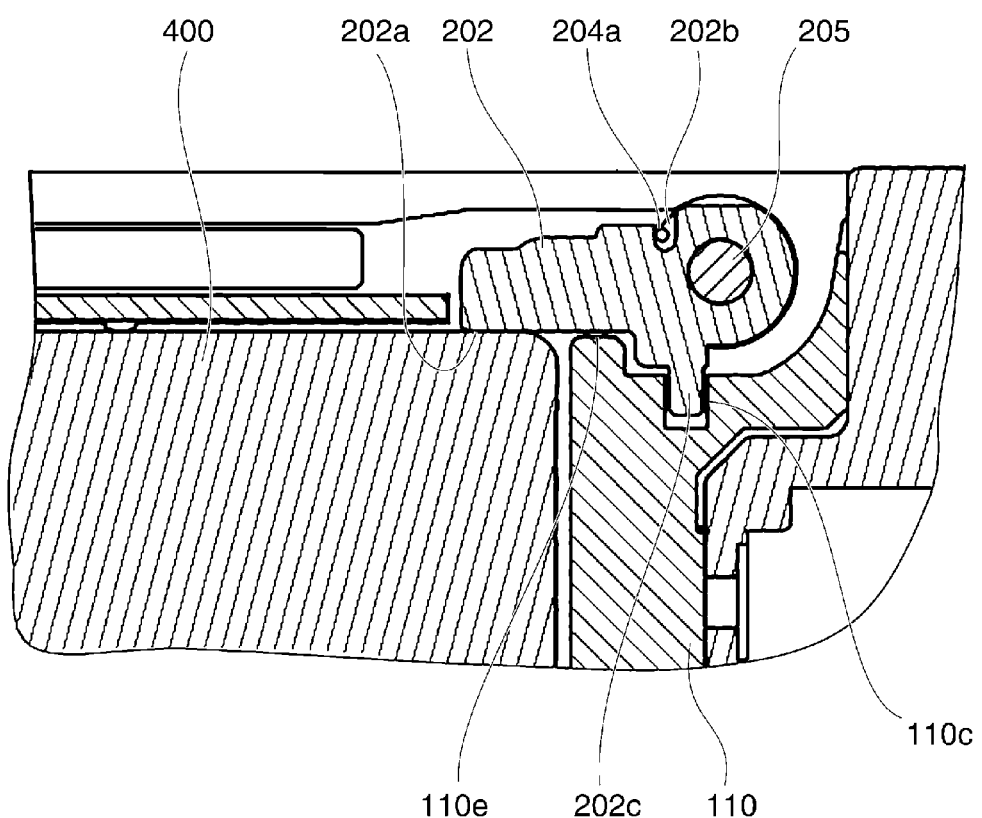
FIG. 3 is a cross-sectional view of essential parts of the digital camera, which is useful in explaining the relationship between a lock member, a battery, a pivot shaft, and a battery compartment member.

FIG. 2 is an exploded perspective view of a battery lid unit. FIG. 3 is a cross-sectional view of essential parts of the digital camera 100, which is useful in explaining the relationship between a lock member 202, the battery 400, the pivot shaft 205, and the battery compartment member 110.

As shown in FIG. 2, the operation member 201 provided in the battery lid 200 has dead bolts 201a, and the dead bolts 201a are brought into engagement with engagement holes, not shown, of the camera body 101 by sliding the operation member 201 in a state where the battery lid 200 is closed, whereby the battery lid 200 is held in the closed state. A plate 203 is integrally fixed to the back surface of the battery lid 200 with screws 206 in a manner sandwiching the operation member 201 between the battery lid 200 and the plate 203 itself. The pivot shaft 205 is inserted through the battery lid 200 and the plate 203, with opposite ends thereof supported by the battery compartment member 110. In the present embodiment, an assembly of the battery lid 200 and the plate 203 corresponds to an example of a battery lid of the invention. Although in the present embodiment, the battery lid 200 and the plate 203 are both pivotally supported by the pivot shaft 205, only the plate 203 may be pivotally supported by the pivot shaft 205 and the battery lid 200 may be fixed to the plate 203 instead of being pivotally supported by the pivot shaft 205.

The lock member 202 is axially movably fitted on the pivot shaft 205 in a state restricted from rotation. The lock member 202 is configured to be engaged with the battery 400 or the coupler 300 accommodated in the battery compartment 110a to thereby lock the battery 400 or the coupler 300 so as to prevent the same from moving in a direction of removal from the battery compartment 110a.

As shown in FIG. 3, the lock member 202 is formed with a rib 202c, and rotation of the lock member 202 in clockwise and counterclockwise directions, as viewed in FIG. 3, is restricted by engagement of the rib 202c with a rotation restriction groove 110c formed in the battery compartment member 110. Further, the lock member 202 is brought into contact with a contact surface 110e formed in the battery compartment member 110 in the direction of insertion of the battery 400 or the coupler 300, and the contact surface 110e restricts rotation of the lock member 202 in the counterclockwise direction, as viewed in FIG. 3.

As shown in FIGS. 2 and 3, an urging member 204 is comprised of a compression coil spring 204c fitted on a cylindrical portion of the lock member 202, and a pair of arms 204a and 204b formed on opposite ends of the compression coil spring 204c. The compression coil spring 204c urges the lock member 202 along the axis of the pivot shaft 205 in a direction for engaging the battery 400 or the coupler 300 accommodated in the battery compartment 110a.

The arm 204a as one of the pair of arms 204a and 204b is hooked to a hook groove 202b formed in the lock member 202, and the other arm 204b is hooked to a hook projection 200a formed in the battery lid 200. Thus, the battery lid 200 is urged together with the plate 203 in the opening direction about the pivot shaft 205.

Figure 4A:
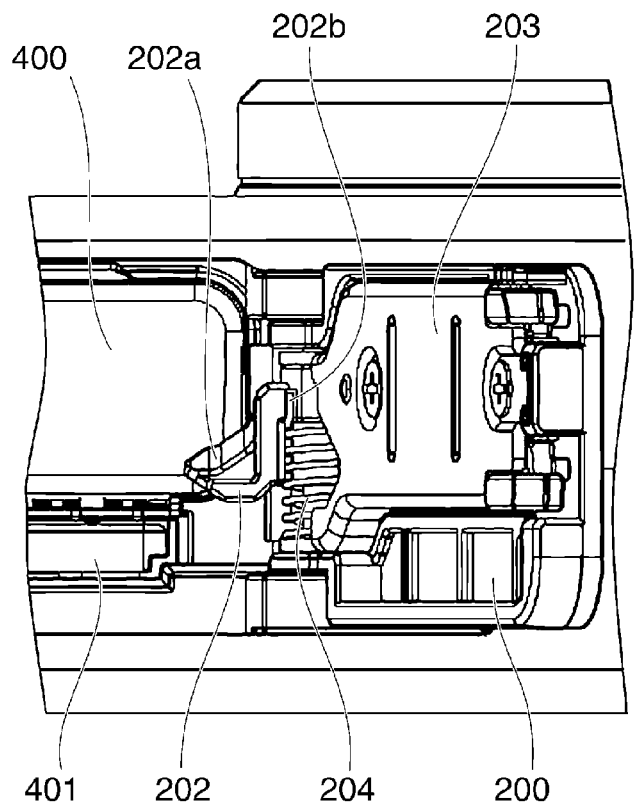
FIG. 4A is a view showing a state of part of the digital camera, as viewed from the bottom side of a camera body, in which the lock member is in a position for engaging (locking) the battery accommodated in the battery compartment, with the battery lid being open.
Figure 4B:
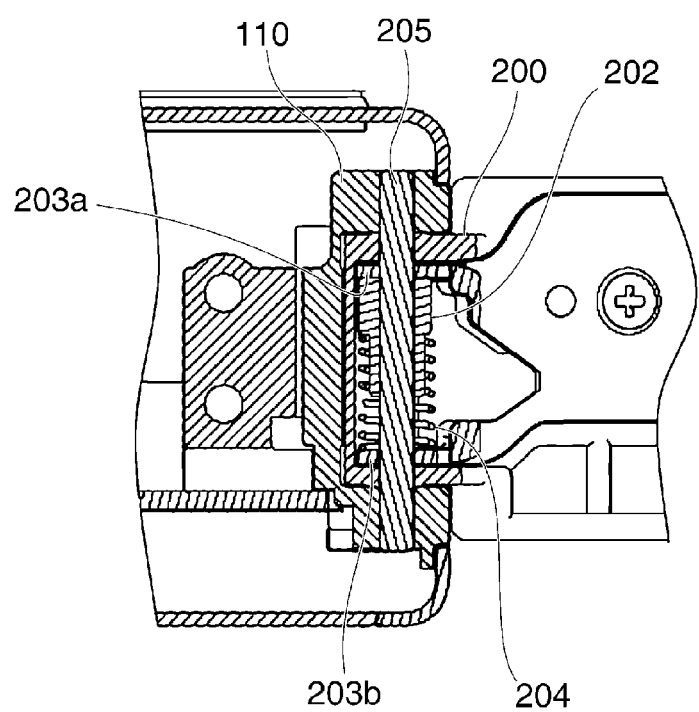
FIG. 4B is a partly cut-away, cross-sectional view of the part of the digital camera shown in FIG. 4A, including a mechanism for lock and unlock operation of the lock member.

FIG. 4A is a view showing a state of part of the digital camera 100, as viewed from the bottom side of the camera body 101, in which the lock member 202 is in the position for engaging (locking) the battery 400 accommodated in the battery compartment 110a, with the battery lid 200 being open. FIG. 4B is a partly cut-away, cross-sectional view of the part of the digital camera shown in FIG. 4A, including a mechanism for lock and unlock operation of the lock member 202.

In the state shown in FIG. 4, the lock member 202 is urged by the compression coil spring 204c of the urging member 204 along the axis of the pivot shaft 205, and has been moved by the urging force of the compression coil spring 204c along the axis of the pivot shaft 205 to the position for engaging a rear end of the battery 400 accommodated in the battery compartment 110a in the direction of insertion thereof (i.e. an opposite end of the battery 400 from the terminal side of the same). This causes an engaging portion 202a formed on a front end of the lock member 202 to be engaged with the battery 400 accommodated in the battery compartment 110a to thereby lock the battery 400 such that it is prevented from projecting out of the battery compartment 110a.

At this time, the lock member 202 is in contact with a contact portion 203a of the plate 203 fixed to the battery lid 200, and therefore the urging force of the compression coil spring 204c along the axis of the pivot shaft 205 is received by the contact portion 203a, whereby an area of engagement of the engaging portion 202a of the lock member 202 with the battery 400, i.e. the position of engagement of the same with the battery 400 is determined.

Figure 5A:
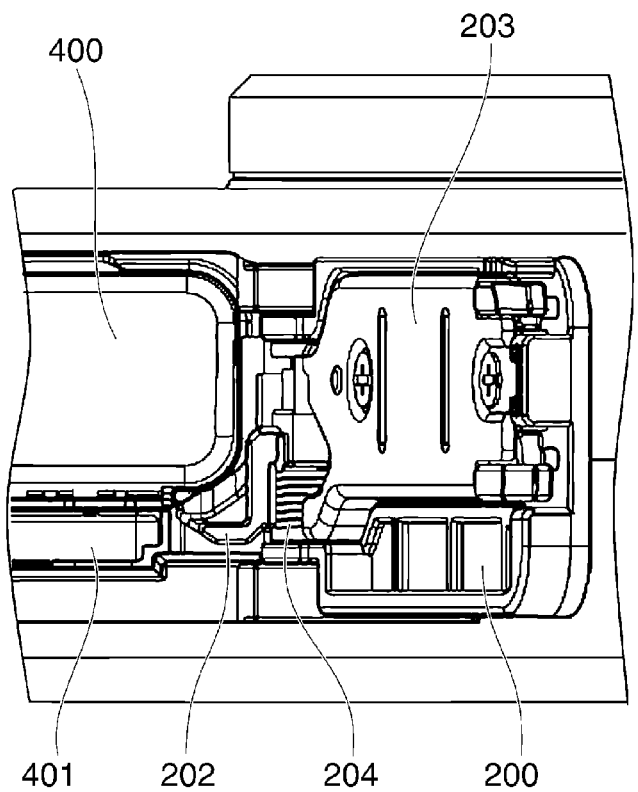
FIG. 5A is a view showing a state of the part of the digital camera, as viewed from the bottom side of the camera body, in which the lock member is in a position retreated from the battery accommodated in the battery compartment, with the battery lid being open.
Figure 5B:
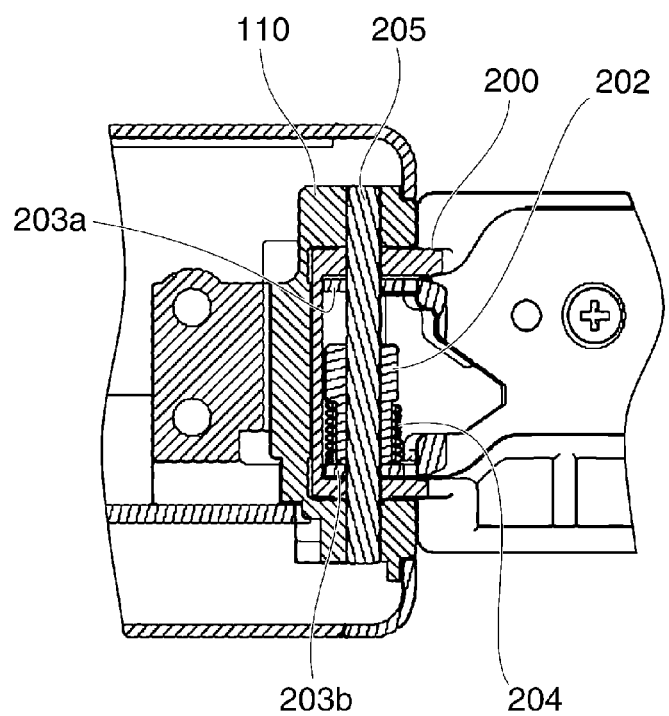
FIG. 5B is a partly cut-away, cross-sectional view of the part of the digital camera shown in FIG. 5A, including the mechanism for lock and unlock operation of the lock member.

FIG. 5A is a view showing a state of the part of the digital camera 100, as viewed from the bottom side of the camera body 101, in which the lock member 202 is in a retreat position where the lock member 202 is retreated from the battery 400 accommodated in the battery compartment 110a, with the battery lid 200 being open, and FIG. 5B is a partly cut-away, cross-sectional view of the part of the digital camera 100 shown in FIG. 5A, including the mechanism for lock and unlock operation of the lock member 202.

FIGS. 5A and 5B show the state where the lock member 202 has been moved by user operation to the retreat position where the lock member 202 is retreated from the battery 400 against the urging force of the compression coil spring 204c. In this state, engagement of the engaging portion 202a of the lock member 202 with the battery 400 has been released, and the battery 400 is urged by a discharge spring, not shown, provided in the bottom of the battery compartment 110a, to project from the battery compartment 110a to a position from where the battery 400 can be taken out.

At this time, the lock member 202 is brought into abutment with a contact portion 203b of the plate 203, whereby the retreat position is determined. The lock member 202 is retreated into an empty space formed when the pivot shaft 205, the battery 400, and the external recording medium 401 are arranged, which makes it possible to reduce space required in the vertical direction of the camera body 101. Therefore, it is possible to make effective use of limited space to thereby achieve space saving.

Figure 6:
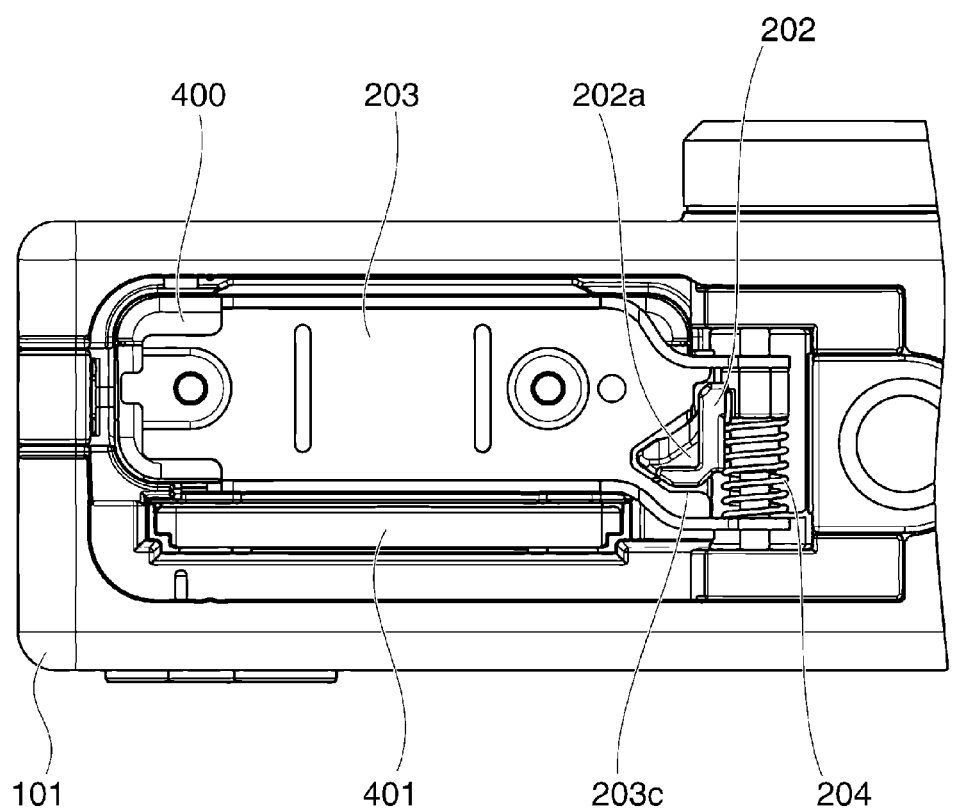
FIG. 6 is a view showing a state of part of the digital camera, as viewed from the bottom side of the camera body, in which the battery is accommodated in the battery compartment and a plate is closed.

FIG. 6 is a view showing a state of part of the digital camera 100, as viewed from the bottom side of the camera body 101, in which the battery 400 is accommodated in the battery compartment 110a and the plate 203 is closed. Note that in FIG. 6, the battery lid 200 is omitted from illustration for convenience.

In the state shown in FIG. 6, the lock member 202 has been moved by the urging force of the compression coil spring 204c of the urging member 204 along the axis of the pivot shaft 205 to the position for engaging the battery 400, similarly to FIG. 4. In this state, the battery lid 200 is closed together with the plate 203.

At this time, the lock member 202 is fitted into a cutout 203c formed in the plate 203. In other words, the plate 203 and the lock member 202 are brought into engagement with each other. With this, even when a drop impact or the like acts and attempts to cause the lock member 202 to move in a direction of release of the battery 400 from the engagement state, in a closed state of the battery lid 200, it is possible to restrict the motion of the lock member 202 by the cutout 203c. As a consequence, it is possible to positively lock the battery 400 accommodated in the battery compartment 110a.

Figure 7A:
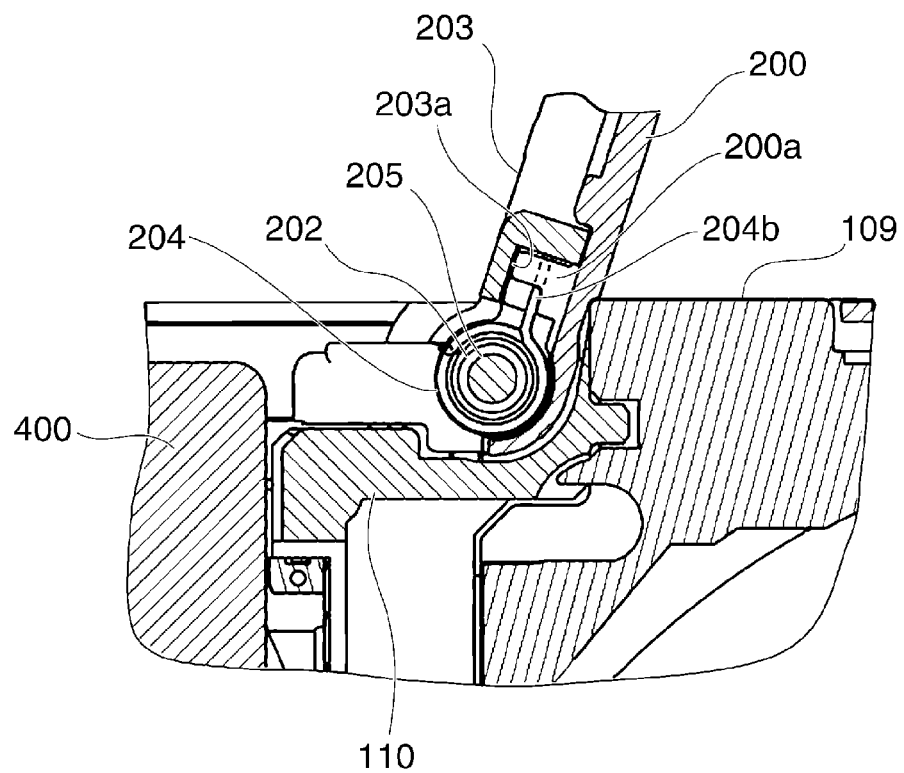
FIG. 7A is a cross-sectional view of essential parts of the digital camera in a state where the battery lid is open.
Figure 7B:
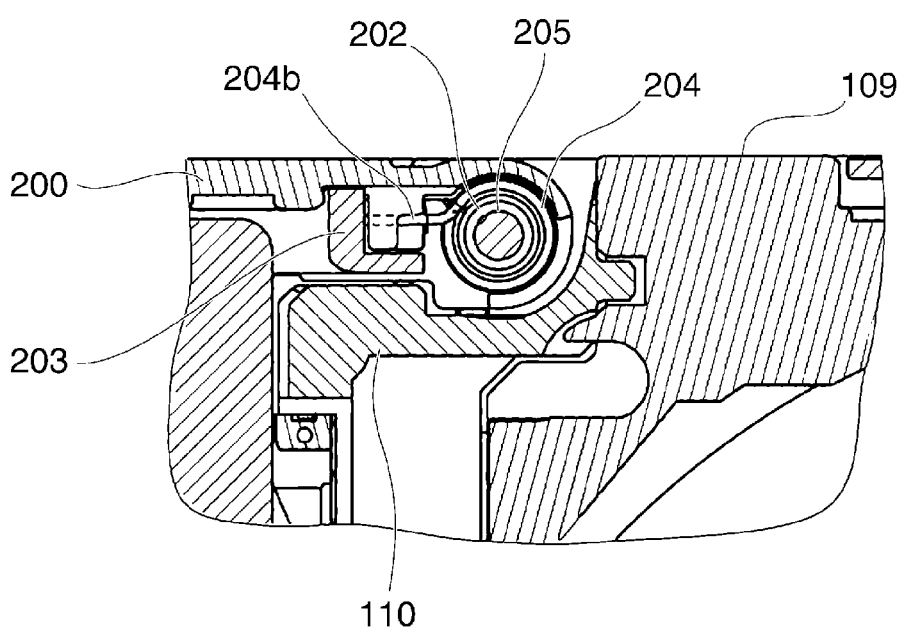
FIG. 7B is a cross-sectional view of the essential parts of the digital camera in a state where the battery lid is closed.

FIG. 7A is a cross-sectional view of essential parts of the digital camera 100 in a state where the battery lid 200 is open, and FIG. 7B is a cross-sectional view of the essential parts in a state where the battery lid 200 is closed.

In the state shown in FIG. 7A, the battery lid 200 is urged by the urging member 204 in the opening direction, and the arm 204b of the urging member 204 is hooked to the hook projection 200a, as described hereinabove. The hook projection 200a is covered by a protruding wall 203a provided on the plate 203 so as to prevent the arm 204b from being unhooked from the hook projection 200a even when a drop impact or the like is applied.

Further, the urging member 204 and the lock member 202 are disposed coaxially with the pivot shaft 205 about which the battery lid 200 is pivotally moved. This makes it possible not only to dispose the lock mechanism for locking the battery 400 or the coupler 300, with high space efficiency, but also to achieve efficient pivotal motion of the battery lid 200.

In the state shown in FIG. 7B, the battery lid 200 has been pivotally moved to its closed position together with the plate 203 and the operation member 201 against the urging force of the urging member 204. By slidingly operating the operation member 201 to bring the dead bolts 201a into engagement with the associated engagement holes, not shown, of the camera body 101 in the state shown in FIG. 7B, the battery lid 200 is held in the closed state.

Figure 8:
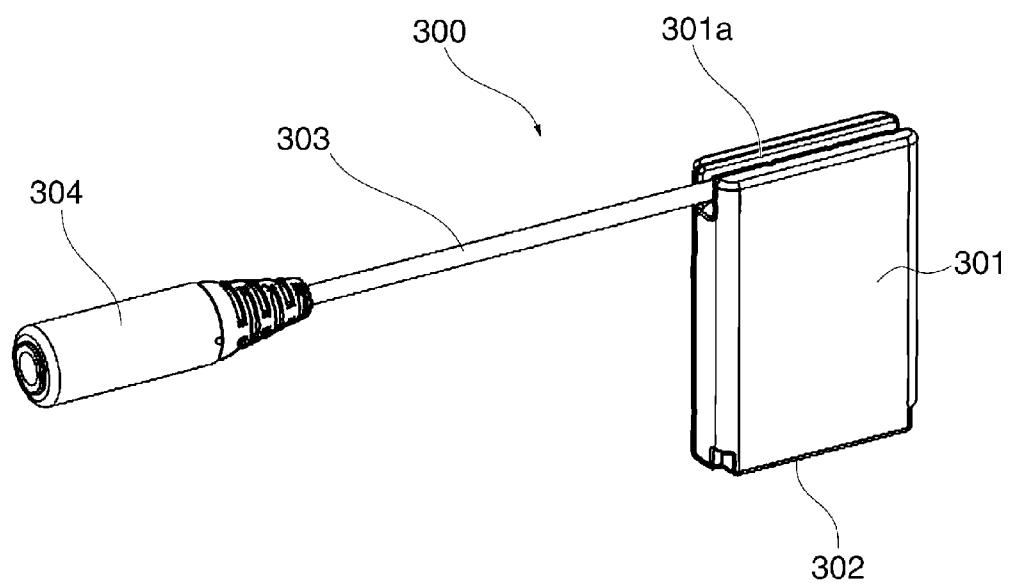
FIG. 8 is a perspective view of an external power supply coupler to be accommodated in the battery compartment in place of the battery.

FIG. 8 is a perspective view of the external power supply coupler 300 to be accommodated in the battery compartment 110a in place of the battery 400.

As shown in FIG. 8, the coupler 300 has a coupler body 301 and a cable 303 drawn out from a center of a top surface of the coupler body 301. The coupler body 301 has substantially the same shape as the battery 400, and the cable 303 has a front end provided with a connection part 304 to be connected to an external power supply.

The coupler body 301 has a bottom surface thereof formed with electrodes 302 similarly to the battery 400. When the coupler body 301 is accommodated in the battery compartment 110a, the electrodes 302 are electrically connected to a connector provided in the bottom of the battery compartment 110a. This enables electric power to be supplied to the digital camera 100 from the external power supply via the coupler 300.

The coupler body 301 has the top surface thereof formed with a slit 301a for use in drawing out the cable 303. The slit 301a is formed in a manner extending over the entire width of the coupler body 301 in the left-right direction as viewed in FIG. 8. The cable 303 is drawn out from the center of the coupler body 301 in the width direction, and it is possible to draw out the cable 303 in a direction changed through 180 degrees from the state shown in FIG. 8.

Figure 9:
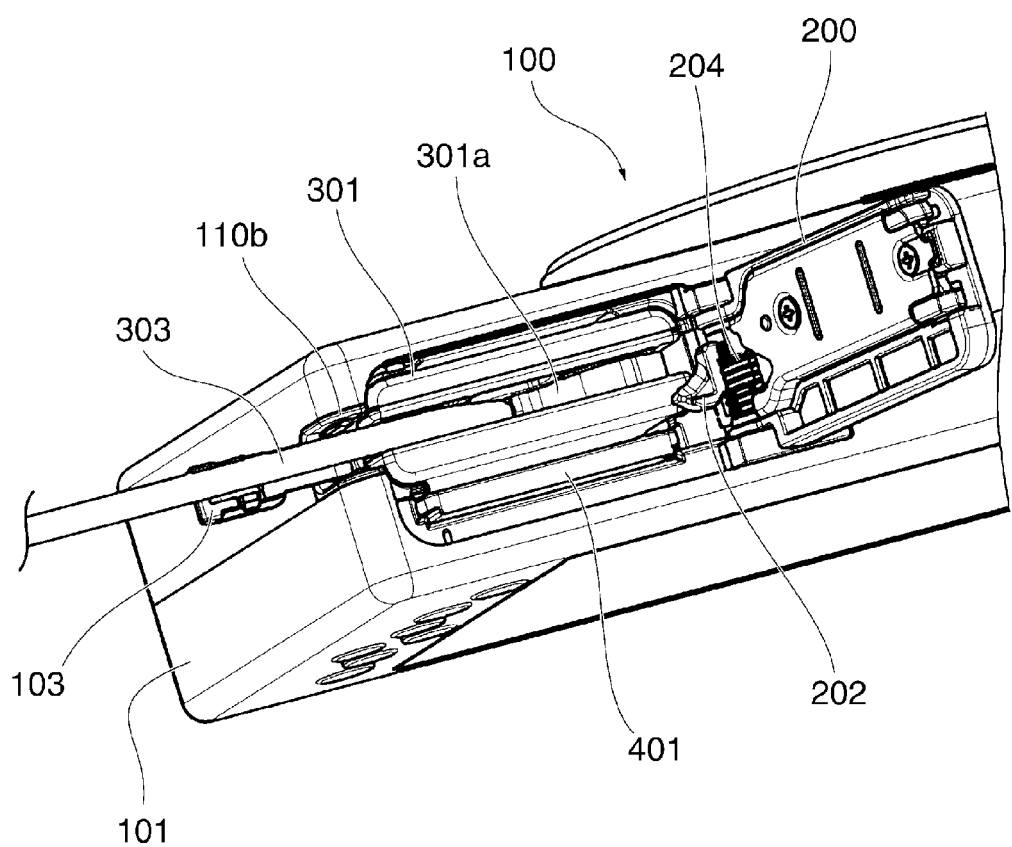
FIG. 9 is a perspective view showing a state of part of the digital camera, as viewed from the bottom side of the camera body, in which a coupler body is accommodated in the battery compartment and the battery lid is open.

FIG. 9 is a perspective view showing a state of part of the digital camera 100, as viewed from the bottom side of the camera body 101, in which the coupler body 301 of the coupler 300 is accommodated in the battery compartment 110a and the battery lid 200 is open.

Similarly to the battery 400, the coupler body 301 accommodated in the battery compartment 110a is locked by the lock member 202, as shown in FIG. 9. Further, according to the present embodiment, although the coupler body 301 is formed with the slit 301a, it is possible to positively lock the coupler body 301 in the battery compartment 110a at a location avoiding the slit 301a.

After opening the cable lid 103 provided in the camera body 101, the cable 303 is drawn out of the camera body 101 through a groove 110b formed in the battery compartment member 110 and the camera body 101.

Further, in the state shown in FIG. 9, it is possible to close the battery lid 200 and bring the dead bolts 201a of the operation member 201 into engagement with the associated engagement holes, not shown, of the camera body 101. The cable 303 is drawn out laterally from the camera body 101, so that the camera body 101 can be placed e.g. on a floor even in a state where the coupler 300 is mounted in the camera body 101.

As described above, according to the present embodiment, even when the size of the camera body 101 and that of battery 400 are reduced, the lock mechanism for locking the battery 400 accommodated in the battery compartment 110a can be disposed with high space efficiency, which makes it possible to achieve reduction of the number of component parts and the thickness and size of the digital camera 100.

Next, a description will be given, with reference to FIGS. 10 to 12C, of a digital camera which is an electronic apparatus according to a second embodiment of the invention. Note that duplicate description of components corresponding to those in the first embodiment is omitted by denoting them using the same reference numerals.

Figure 10:
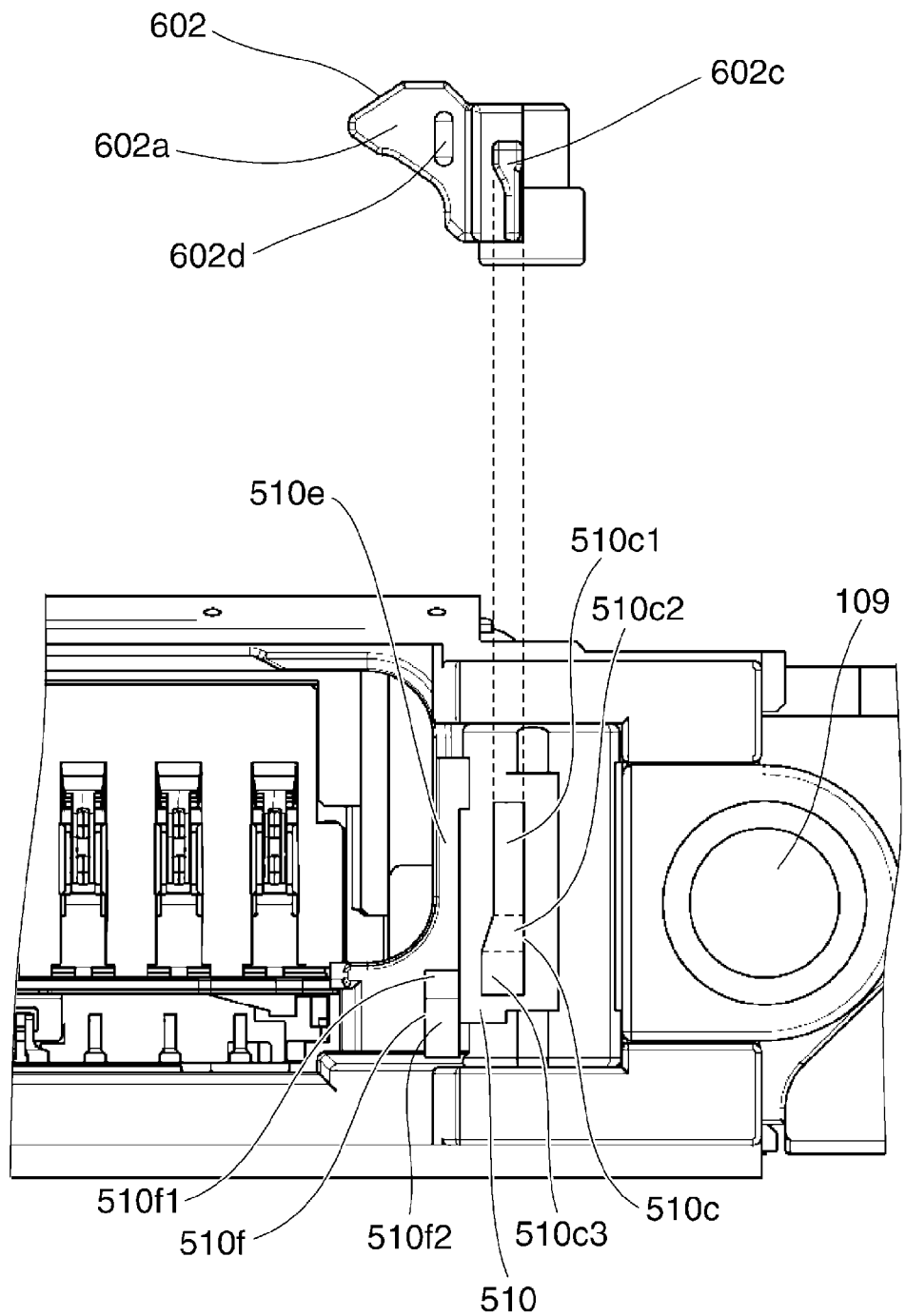
FIG. 10 is a plan view of essential parts of a digital camera, as viewed from the bottom side of a camera body of the digital camera which is an electronic apparatus according to a second embodiment of the invention.

FIG. 10 is a plan view of essential parts of the digital camera, as viewed from the bottom side of a camera body 101 thereof. In the present embodiment, the lock member 202 and the battery compartment member 110 in the first embodiment are replaced by a lock member 602 and a battery compartment member 510, respectively. Further, in FIG. 10, the lock member 602 is shown in a state inversed by 180 degrees from a state engaged with the battery compartment member 510.

As shown in FIG. 10, the lock member 602 has a protrusion 602c, and the protrusion 602c is brought into engagement with an engagement groove 510c formed in the battery compartment member 510. The engagement groove 510c has a first area 510c1, a second area 510c2, and a third area 510c3 continuously formed therein. The first area 510c1 has a width set only slightly larger than that of the protrusion 602c. Therefore, when the protrusion 602c is engaged with the first area 510c1, the lock member 602 cannot pivotally move about the pivot shaft 205. The third area 510c3 has a width set larger than that of the first area 510c1. Therefore, when the protrusion 602c is engaged with the third area 510c3, the lock member 602 can pivotally move about the pivot shaft 205.

The second area 510c2 is formed between the first area 510c1 and the third area 510c3. The second area 510c2 has a width progressively increased and continuously connects between the first area 510c1 and the third area 510c3. The engagement groove 510c formed with the plurality of areas 510c1, 510c2, and 510c3, and the protrusion 602c function as a restriction unit for restricting or permitting the pivotal motion of the lock member 602 about the pivot shaft 205.

Similar to the first embodiment, the lock member 602 is urged by the urging member 204 toward the front side of the camera body 101 along the axis of the pivot shaft 205. Within a range where a lock portion 602a of the lock member 602 locks a battery accommodated in a battery compartment 510a formed in the battery compartment member 510, the protrusion 602c is held in engagement with the first area 510c1 of the engagement groove 510c. With this, the pivotal motion of the lock member 602 about the pivot shaft 205 is restricted, and the lock member 602 is inhibited from pivotally moving, mainly when the lock member 602 receives a force acting in the battery discharge direction.

Further, the lock member 602 has a sliding portion 602d. The battery compartment member 510 is formed with a sliding surface 510e and a cam surface 510f. The cam surface 510f is formed in a manner protruding from the sliding surface 510e, and has a sloped surface 510f1 and a flat surface 510f2. When the lock member 602 is slidingly moved toward the rear of the camera body 101 along the axis of the pivot shaft 205 against the urging force of the urging member 204, the sliding portion 602d slides over the sliding surface 510e formed in the battery compartment member 510. Within the range where the lock portion 602a of the lock member 602 locks the battery accommodated in the battery compartment 510a, the sliding portion 602d slides over the sliding surface 510e. The sliding portion 602d and the cam surface 510f function as a pivotal motion-causing unit configured to cause the lock member 602 to pivotally move about the pivot shaft 205 shaft, when the lock member 602 is moved from a first position to a second position.

Hereafter, more detailed description will be given of the function of the pivotal motion-causing unit. Within the range where the lock portion 602a of the lock member 602 locks the battery accommodated in the battery compartment 510a, the protrusion 602c is held in engagement with the first area 510c1 of the engagement groove 510c. Therefore, the lock member 602 cannot pivotally move about the pivot shaft 205.

In the above-described first embodiment, the pivotal motion of the lock member 202 about the pivot shaft 205 is restricted within the whole sliding range of the lock member 202. On the other hand, in the present embodiment, from a position where the lock member 602 is slid by a predetermined amount in the direction of retreat from the battery, the pivotal motion of the lock member 602 about the pivot shaft 205 is permitted. Here, a position where the lock member 602 is brought out of imaginary projection of a restriction surface where the battery is restricted from being discharged is set as a pivotal motion start position, by way of example. More specifically, a position where the lock portion 602a of the lock member 602 releases the battery accommodated in the battery compartment 510a from the locked state is the pivotal motion start position. Note that this position can be changed forward or rearward according to the function or operability of the lock member 602 and associated members.

When the lock member 602 is slid to the pivotal motion start position against the urging force of the urging member 204, the protrusion 602c of the lock member 602 is brought into engagement with the second area 510c2 of the engagement groove 510c.

At this time, the sliding portion 602d of the lock member 602 has been shifted from a state sliding over the sliding surface 510e to a state sliding over the sloped surface 510f1 of the cam surface 510f. This causes the lock member 602 to start pivotal motion about the pivot shaft 205.

When the lock member 602 is further slid from the pivotal motion start position against the urging force of the urging member 204, the protrusion 602c of the lock member 602 is brought into engagement with the third area 510c3 of the engagement groove 510c. At this time, the sliding portion 602d of the lock member 602 has been shifted from the state sliding over the sloped surface 510f1 of the cam surface 510f to a state sliding over the flat surface 510f2 of the same. This completes the pivotal motion of the lock member 602 about the pivot shaft 205.

Figure 11A:
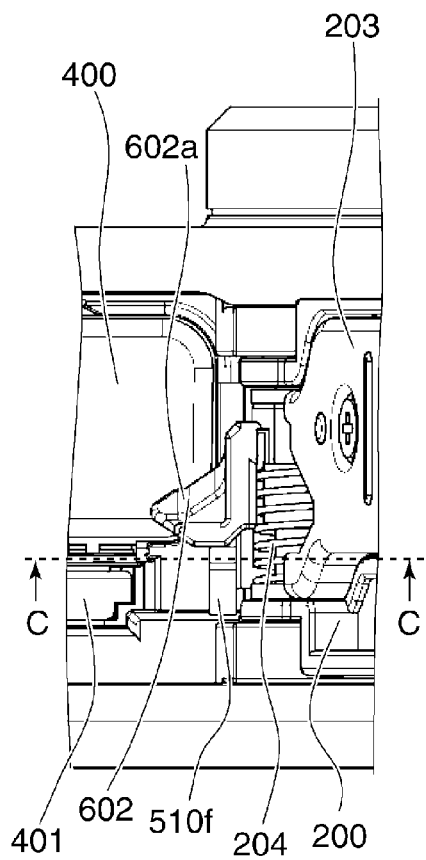
FIG. 11A is a view showing a state of part of the digital camera, as viewed from the bottom side of the camera body, in which a lock member is in a position for engaging a battery accommodated in a battery compartment, with a battery lid being open.
Figure 11B:
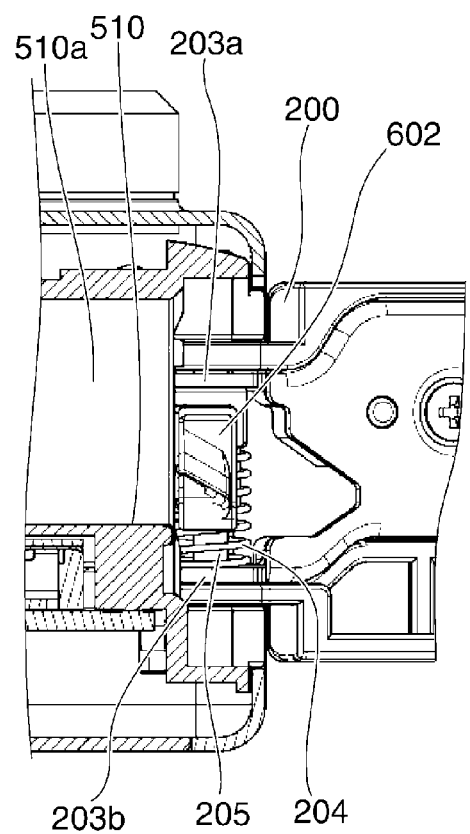
FIG. 11B is a partly cut-away, cross-sectional view of the part of the digital camera shown in FIG. 11A, including the mechanism for lock and unlock operation of the lock member.
Figure 11C:
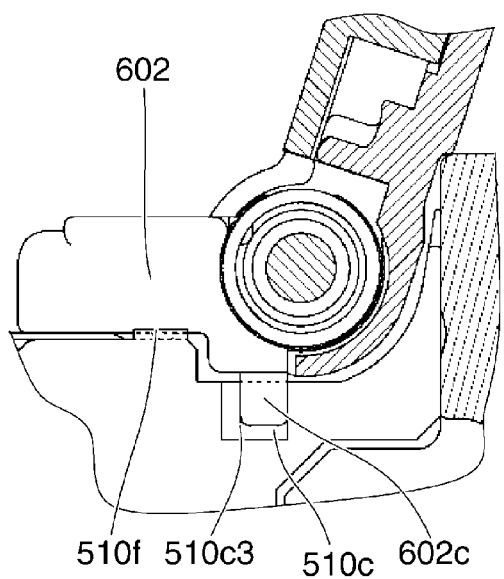
FIG. 11C is a cross-sectional view taken on line C-C of FIG. 11A.

FIG. 11A is a view showing a state of part of the digital camera 100, as viewed from the bottom side of the camera body 101, in which the lock member 602 is in a position for locking the battery 400 accommodated in the battery compartment 510a, with the battery lid 200 being open. FIG. 11B is a partly cut-away, cross-sectional view of the part of the digital camera 100 shown in FIG. 11A, including the mechanism for lock and unlock operation of the lock member 602. FIG. 11C is a cross-sectional view taken on line C-C of FIG. 11A.

In a state shown in FIGS. 11A to 11C, the lock member 602 is urged by the compression coil spring 204c of the urging member 204 toward the front side of the camera body 101 along the axis of the pivot shaft 205. The lock member 602 has been moved by the urging force of the urging member 204 to the position for engaging the end face of the battery 400 accommodated in the battery compartment 510a. This brings the engaging portion 602a of the lock member 602 into engagement with the end face of the battery 400 accommodated in the battery compartment 510a, whereby the battery 400 is held in the state accommodated in the battery compartment 510a.

At this time, the lock member 602 is in contact with the contact portion 203a of the plate 203 fixed to the battery lid 200, and the urging force of the compression coil spring 204c along the axis of the pivot shaft 205 is received by the contact portion 203a, whereby an area of engagement of the lock portion 602a of the lock member 602 with the battery 400, i.e. the position of engagement of the same with the battery 400 is determined. Further, the pivotal motion of the lock member 602 is restricted by engagement of the protrusion 602c with the engagement groove 510c of the battery compartment member 510, as described hereinbefore.

Figure 12A:
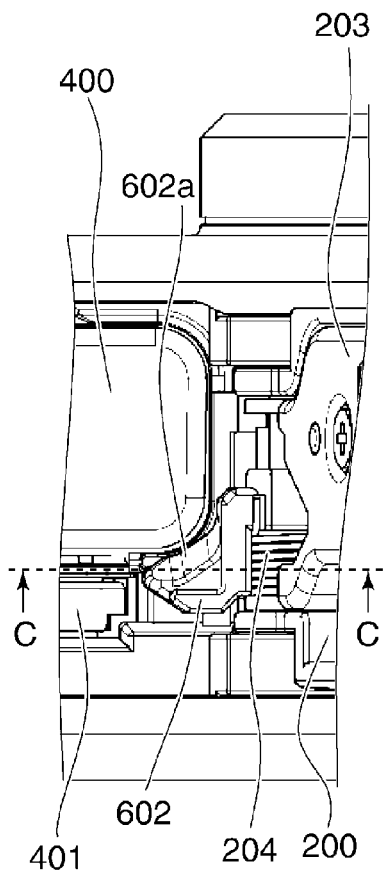
FIG. 12A is a view showing a state of part of the digital camera, as viewed from the bottom side of the camera body, in which the lock member is in a position retreated from the battery accommodated in the battery compartment, with the battery lid being open.
Figure 12B:
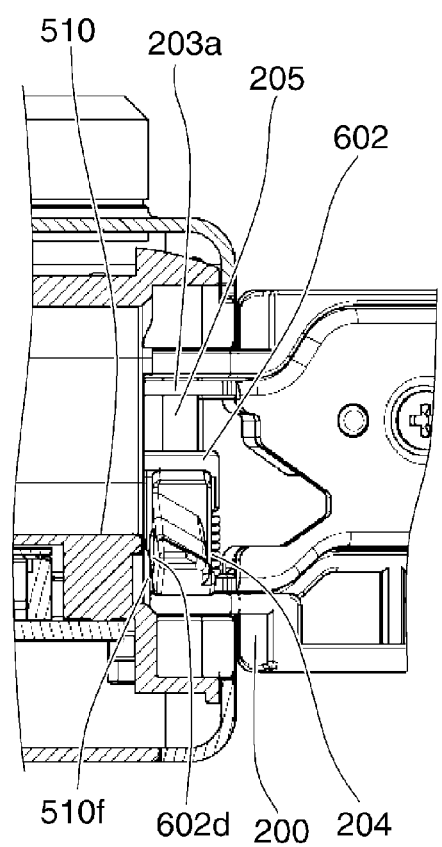
FIG. 12B is a partly cut-away, cross-sectional view of the part of the digital camera shown in FIG. 12A, including the mechanism for lock and unlock operation of the lock member.
Figure 12C:
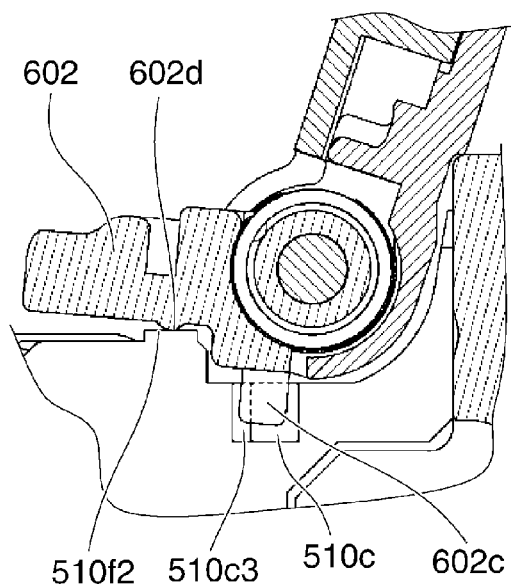
FIG. 12C is a cross-sectional view taken on line C-C of FIG. 12A.

FIG. 12A is a view showing a state of part of the digital camera 100, as viewed from the bottom side of the camera body 101, in which the lock portion 602a of the lock member 602 is in a retreat position where it is retreated from the end face of the battery 400 accommodated in the battery compartment 510a, with the battery lid 200 being open. FIG. 12B is a partly cut-away, cross-sectional view of the part of the digital camera 100 shown in FIG. 12A, including the mechanism for lock and unlock operation of the lock member 602. FIG. 12C is a cross-sectional view taken on line C-C of FIG. 12A.

FIGS. 12A, 12B, and 12C show a state where the lock member 602 has been slidingly moved by user operation to the retreat position where the lock member 602 is retreated from the end face of the battery 400 against the urging force of the compression coil spring 204c. In this state, engagement of the engaging portion 602a of the lock member 602 with the battery 400 has been released, and the battery 400 is urged by a discharge spring, not shown, provided in the bottom of the battery compartment 510a, to project from the battery compartment 510a to a position where the battery 400 can be taken out.

At this time, the lock member 602 is brought into abutment with the contact portion 203b of the plate 203, whereby the retreat position is determined. In this state, the protrusion 602c is in engagement with the third area 510c3 of the engagement groove 510c, and therefore the restriction of pivotal motion of the lock member 602 about the pivot shaft 205 has been released. Further, as the sliding portion 602d has slid over the cam surface 510f, whereby the lock member 602 has been pivotally moved about the pivot shaft 205.

As described above, according to the present embodiment, the lock member 602 is retreated into a space formed when the pivot shaft 205, the battery 400, and the external recording medium 401 are arranged, and a space formed when the battery lid 200 is opened is used for pivotal motion of the lock member 602. This makes it possible, even when the size of the camera body 101 and that of the battery 400 are reduced, to dispose the lock mechanism for locking the battery 400 accommodated in the battery compartment 510a, with high space efficiency, to thereby achieve reduction of the number of component parts and the thickness and size of the digital camera 100.

Further, the present embodiment is distinguished from the first embodiment in an additional feature that the lock member 602 is pivotally moved in the battery discharge direction when slid. This lifts up a finger hook portion of the lock member 602 where a user's finger is to be hooked, to thereby make it easier for a user to hook the finger on the finger hook portion of the lock member 602, which improves operability. The other construction and the advantageous effects are the same as those of the above-described first embodiment.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although in the above-described embodiments, the electronic apparatus of the invention is described as the digital camera, by way of example, this is not limitative, but the invention may be applied to a digital video camera or other kinds of electronic apparatuses.

This application claims the benefit of Japanese Patent Application No. 2014-040235, filed Mar. 3, 2014, and Japanese Patent Application No. 2014-139755, filed Jul. 7, 2014 which are hereby incorporated by reference wherein in their entirety.

What is claimed is:
1. An electronic apparatus comprising:
  a battery compartment member configured to have a battery compartment formed therein for removably accommodating a battery or a coupler;
  a battery lid configured to be capable of opening and closing an insertion opening of the battery compartment;
  a pivot shaft configured to pivotally support said battery lid;

a lock member configured to be brought into engagement with the battery or the coupler accommodated in the battery compartment to thereby lock the battery or the coupler;

an urging member configured to urge said battery lid in an opening direction, wherein said lock member is provided such that said lock member is capable of moving along an axis of said pivot shaft between a first position for being brought into engagement with the battery or the coupler and a second position for releasing the engagement, and wherein said urging member is disposed coaxially with said pivot shaft and urges said lock member toward the first position;

a restriction unit configured to restrict the pivotal motion of said lock member about said pivot shaft when said lock member is positioned in the first position, and permit the pivotal motion of said lock member about said pivot shaft when said lock member is positioned in the second position, and a pivotal motion-causing unit configured to cause said lock member to pivotally move about said pivot shaft, when said lock member is moved from the first position to the second position, wherein said lock member is provided such that said lock member is capable of moving along the axis of said pivot shaft in a state where pivotal motion thereof about said pivot shaft is restricted, and wherein when said battery lid is closed, said battery lid is brought into engagement with said lock member positioned in the first position, to thereby restrict movement of said lock member to the second position.

2. The electronic apparatus according to claim 1, wherein said restriction unit comprises:

an engagement groove formed in said battery compartment member, and a protrusion formed on said lock member, and wherein said engagement groove has a plurality of areas different in width formed therein, and engagement of said protrusion with one of the areas of said engagement groove restricts the pivotal motion of said lock member about said pivot shaft.

3. The electronic apparatus according to claim 1, wherein said pivotal motion-causing unit comprises:

a cam surface formed in said battery compartment member, and a sliding portion formed on said lock member, and wherein during movement of said lock member from the first position to the second position, said sliding portion slides over said cam surface, whereby said lock member is caused to pivotally move about said pivot shaft.

* * * * *